March 4, 1958 W. H. ARCHER 2,825,355
VACUUM FILTERS AND SAFETY DEVICES THEREFOR
Filed Sept. 6, 1955
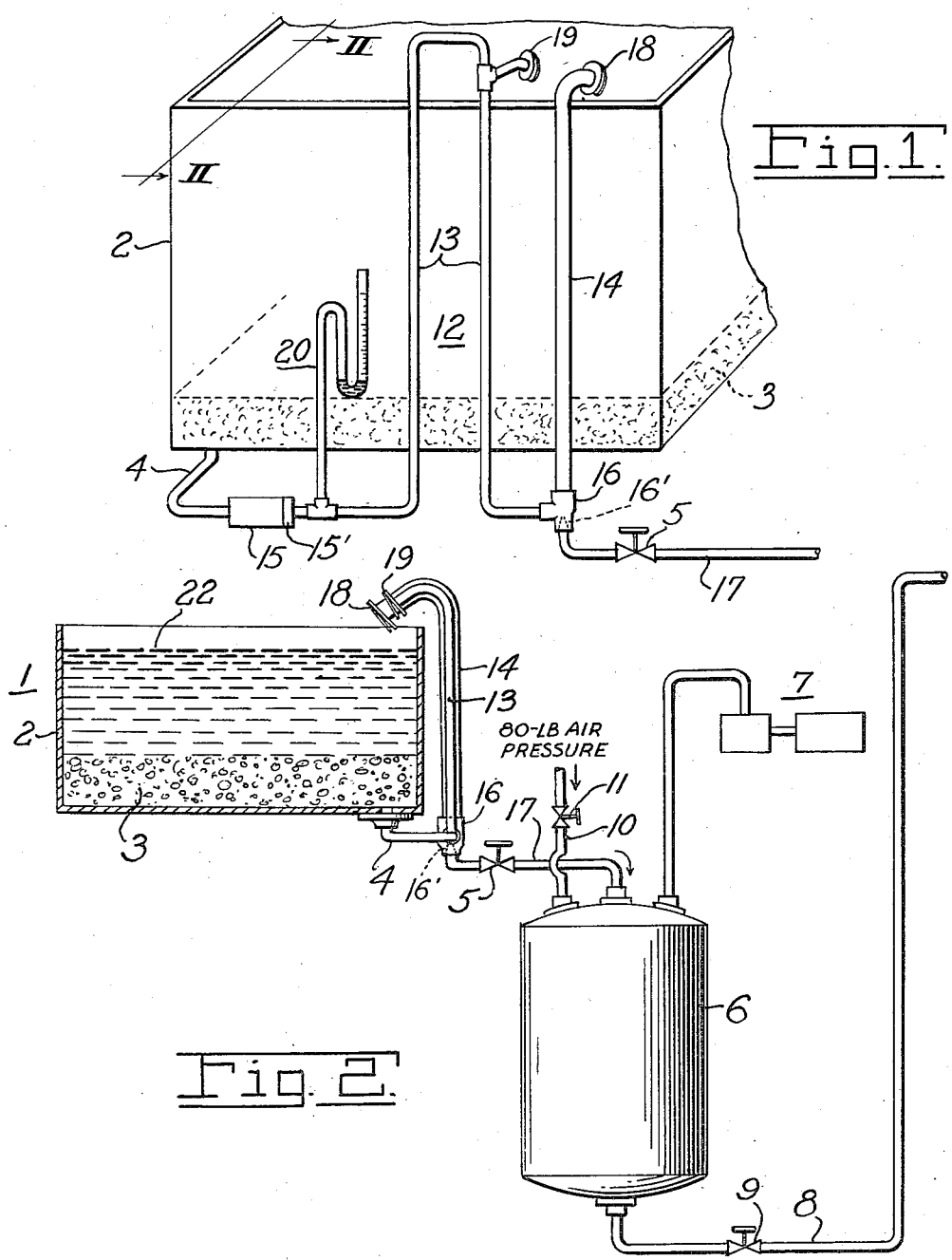
INVENTOR.
WESLEY H. ARCHER
BY
Zugelter & Zugelter
Attys.

2,825,355

VACUUM FILTERS AND SAFETY DEVICES THEREFOR

Wesley H. Archer, Cincinnati, Ohio, assignor to Toms River-Cincinnati Chemical Corporation, Cincinnati, Ohio, a corporation of Delaware Application September 6, 1955, Serial No. 532,529

3 Claims. (Cl. 137—114)

This invention relates to vacuum filters and more particularly to safety devices therefor.

Vacuum filters of the box type employ special stones as the filter medium. The filtrate is pulled through the stones by vacuum into a receptacle. When the receptacle becomes full it is expelled to waste or to process depending on its value. To expel the filtrate the operator should close a valve between the filter and the filtrate vessel or tank and open the discharge valve before applying the expelling pressure to the filtrate tank. If he does not do that the pressure will blow up the filter bed and ruin the stones which are expensive. Furthermore, the shutting down of the filter for repairs results in loss of time and the use of the filter.

An object of this invention is to provide a safety device that will prevent the build-up of pressure under the filter stones even though the valve between the filtrate tank and the filter bed is accidentally left open.

Another object is to provide means for automatically discharging the filtrate into the filter on top of the filter bed thereby preventing build-up of pressure under the filter bed in the event the operator forgets to close the valve between the discharge of the filter and the filtrate tank.

The above and other objects of the invention will be apparent to those of ordinary skill in the art to which the invention pertains from the following description taken in conjunction with the accompanying drawings.

In the drawings:

Figure 1 is a more or less schematic view in perspective of a filter embodying a form of the invention; and Fig. 2 is a schematic view showing the filter in section, the filtrate tank and a vacuum pump, and a form of the invention as applied for the safety of the filter.

As shown in Fig. 2, the filter 1 includes a tank 2 having a filter bed 3 and a discharge pipe 4 provided with a valve 5, through which the filtrate passes to a tank 6. The filter system is provided with a vacuum pump 7 which evacuates the tank 6 and imposes vacuum under the filter bed 3.

The bed 3 is illustrated schematically. In practice that bed is formed of filter stones of the proper porosity and thickness. Usually the filter illustrated is square, being about six feet by six feet in dimensions and requiring about 36 filter stones. These stones are quite expensive per se and if the bed is blown up accidentally, the stones are spoiled and the filter has to come out of service for repairs. These filters have many times been accidentally blown up because the operator forgot to close valve 5 and allowed pressure to build up under the filter bed when pressure was applied to the tank to expel the filtrate therefrom.

The tank 6 has a discharge pipe 8 provided with a valve 9 that is normally closed when the filter is in operation. To expel the filtrate from the tank 6 when it has accumulated to the level at which it must be discharged, pressure in the form of compressed air is applied to the tank through a pipe 10 which enters the tank at the top thereof as shown. A valve 11 is provided in this line so that the pressure can be turned on or off.

As was stated above, filter beds have often been blown up because the operator forgot to close valve 5 when he opened valve 9 and applied pressure to the tank by opening valve 11.

In order to avoid and prevent the accidental blowing-up of the filter bed 3 in the event the operator should forget to close valve 5 before he applied the expelling pressure, the discharge pipe 4 is provided with a pressure relief device or means 12. As shown, that means comprises an inverted U-leg pipe 13 which is connected in series with the discharge pipe 4 and the valve 5 and a riser pipe 14. The pipe 4 may be provided with a sight glass 15 and a sampler blank 15' so that the flow through the pipe 4 can be observed and samples of filtrate taken as required.

The discharge side of the inverted U-pipe 13 is connected by a T-fitting 16 to the bottom of the riser 14 and to the inlet of valve 5. The T 16 is provided with a jet or nozzle 16' which in turn is connected by a pipe section 17 to the tank. The nozzle 16' is so directed that the velocity head produced by back flow through valve 5 should it be open when tank 6 is being expelled, is sufficient to produce an aspirating or ejecting effect on the inverted U-pipe 13. The top of the leg 14 is provided with a flap valve 18 and the down leg of the U-pipe 13 is provided with a flap valve 19. These valves open under pressure but close when vacuum is pulling filtrate through the filter bed.

It has been found in practice that the riser 14 should be larger in diameter than the diameter of the pipes which form the inverted U 13. By using a pipe 14 having a diameter of say two inches in diameter and pipes in the inverted U 13 of one and a half inches diameter, it has been found that, in the event valve 5 is open, the filtrate from the tank will be discharged through flap valves 18 and 19 without building up damaging pressures under the filter. By connecting a manometer 20 to the outlet of the sight glass 15, it has been found that with the valve 5 open and pressure of 80 pounds per square inch applied to the tank 6, the pressure which builds up under the filter bed as measured by the manometer is of the order of one and a half to two inches of water. A pressure of that low order is not sufficient to damage the filter bed.

In operation of the filter system illustrated, the valve 11 is closed, valve 5 is opened and valve 9 is closed. The vacuum pump 7 is operated to apply vacuum to the underside of the filter bed so that the liquid 22 to be filtered is pulled through the filter stones and into the tank 6 passing upwardly through the U-tube 13 and the nozzle 16' in T 16 to the line in which valve 5 is located. As the filtrate accumulates in the tank 6 there comes a time when its capacity is reached and it has to be expelled either to waste or to process depending upon whether the filtrate has value or not. To expel the filtrate the normal practice is to close valve 5, open valve 9 and then apply the pressure to the tank by opening valve 11. If, however, valve 5 should accidentally be left open the applied pressure will expel filtrate through the riser 14 and its flap valve 18 and thereby relieve pressure on the underside of the filter bed. If the pressure is not sufficiently relieved the excess is taken by the riser of the inverted U 13 to which the flap valve 19 is connected.

Having thus described an embodiment of the invention, it will be apparent to those of ordinary skill in the art to which the invention pertains that various modifications and changes may be made in the illustrated em-

Therefore, what is claimed as new and desired to be secured by Letters Patent is:

1. A safety device for a filter bed discharge line which comprises a jet aspirator mounted in series with the discharge line, a riser aligned with the discharge of the aspirator, there being a discharge opening in the riser, and a check valve for closing the discharge opening of the riser when the discharge line is subjected to a vacuum, the valve being adapted to open under increased pressure, the jet portion of the aspirator being mounted at the junction of the discharge line and the riser and directed to draw fluid from the discharge line upstream of the aspirator when an increased pressure is applied to the downstream end of the aspirator to prevent substantial back pressure in the discharge line upstream of the aspirator.

2. A safety device for a filter bed discharge line which comprises an inverted U-shaped tube and a jet aspirator in series with the discharge line, the aspirator being downstream of the U-shaped tube, a riser aligned with the discharge of the aspirator, there being discharge openings in the upper portions of the riser and of the U-shaped tube, and check valves for closing said discharge openings when the discharge line is subjected to a vacuum, the valves being adapted to open under increased pressure, the jet portion of the aspirator being mounted at the junction of the discharge line and the riser and directed to draw fluid from the U-shaped tube when increased pressure is applied to the downstream end of the aspirator to prevent substantial back pressure in the discharge line upstream of the U-shaped tube.

3. A safety device for a filter bed discharge line which comprises an inverted U-shaped tube and a jet aspirator in series with the discharge line, the aspirator being downstream of the U-shaped tube, a riser aligned with the discharge of the aspirator, there being discharge openings in the upper portions of the riser and of the U-shaped tube, the diameter of the riser being greater than the diameter of the legs of the inverted U-shaped tube, and check valves for closing the openings when the discharge line is subjected to a vacuum, the valves being adapted to open under increased pressure, the jet portion of the aspirator being mounted at the junction of the discharge line and the riser and directed to draw fluid from the U-shaped tube when increased pressure is applied to the downstream end of the aspirator to prevent substantial back pressure in the discharge line upstream of the U-shaped tube.

References Cited in the file of this patent

UNITED STATES PATENTS

| | | |
|---|---|---|
| 1,617,884 | Wheeler | Feb. 15, 1927 |
| 2,073,784 | Day | Mar. 16, 1937 |